United States Patent [19]

Husson

[11] 4,420,375

[45] Dec. 13, 1983

[54] SOLAR STILL

[76] Inventor: Frank D. Husson, 10414 Woodchuck Point, San Diego, Calif. 92131

[21] Appl. No.: 297,228

[22] Filed: Aug. 28, 1981

[51] Int. Cl.³ .............................................. B01D 1/00
[52] U.S. Cl. .............................. 202/234; 203/DIG. 1
[58] Field of Search ........................... 202/234, 185 B; 203/DIG. 1

[56] References Cited

U.S. PATENT DOCUMENTS 3,655,517  4/1972  Hensley et al. ................ 203/DIG. 1
4,227,970  10/1980  Howell, Jr. et al. ................. 202/234

Primary Examiner—Hiram H. Bernstein

Attorney, Agent, or Firm—James J. Burke, II

[57] ABSTRACT

A highly efficient and economic solar distillation unit comprising a plurality of angled trays in a frame, each tray including a vaned absorber element on the bottom surface. The trays are extruded in plastic and cut to size, as are the absorber elements and frame sidewalls. Frame endwalls are cut from flat extrusions. A transparent glass removable cover completes the basic assembly, but many variations are possible, including means to monitor and control water level within the unit from a storage tank. With the exception of an optional check valve there are no moving parts. There are no metal parts, and the basic unit is glued together from plastic extrusions and flat plates.

7 Claims, 9 Drawing Figures

SOLAR STILL

BACKGROUND OF THE INVENTION

The present invention relates in general to solar distillation of fluids and, more particularly, it relates to a still unit for purifying water that is saline, brackish or otherwise unsafe or unpleasant for consumption.

Within the United States, most of the so-called "hard water" areas lie in the Sun Belt, where solar radiation is plentiful. While zeolite filters and other water softening devices may be installed in pressurized domestic water systems they are expensive, and require either backwashing or, more frequently, filter replacement, also an expensive factor. In remote areas, such conveniences are not available, and means to provide safe, potable water, even if only a gallon or two per day, are needed.

More important, over much of the equatorial tropic and sub-tropic zones of the earth, piped water systems and water purification are unknown, and the water supply is at all times an at least potential health hazard. With particular respect to infants, it is a hazard to life itself.

Units for solar distillation of water or other fluids are far from new. A sloped structure including a plurality of fluid trays arranged in step-wise fashion was patented by Wheeler et al in 1870, No. 102,633, and there are likely older examples. A similar structure is disclosed in the French patent of Pasteur, No. 883,117, issued in 1943. More recently, a foamed plastic structure including sloped steps was disclosed by Hensley et al, U.S. Pat. No. 3,655,517, in 1972.

It is not known if any of these or similar units were marketed in the past and as for the present, a unit was rumored as being manufactured in Western Australia, but the manufacturer could not be located.

Of course, to be economically viable any such unit must be widely distributed or sold in areas of need, and the cost must be small. Yet, a successful solution must incorporate a good amount of sophisticated technology in both materials and manufacturing. Such technology is not available at an economic distance from the ultimate consumers, on a world-wide basis. The present invention overcomes this problem by concentrating the technological aspects at the "front" or raw-materials end, coupled with an extremely simple assembly operation that can be carried out with simple tools and only minimal instruction.

OBJECTS OF THE INVENTION

A general object of the present invention is to provide an improved solar distillation unit.

Another object of the present invention is to provide a solar distillation unit of improved thermal efficiency.

A further object of the present invention is to provide a very inexpensive solar distillation unit that is also simple to assemble and to use.

A still further object of the present invention is to provide a solar distillation unit that is durable and does not degrade at high solar flux levels.

Various other objects and advantages of the invention will become clear from the following description of embodiments, and the novel features will be particularly described in connection with the appended claims.

THE DRAWINGS

Reference will hereinafter be made to the accompanying drawings, wherein.

DESCRIPTION OF EMBODIMENTS

Figure 1:
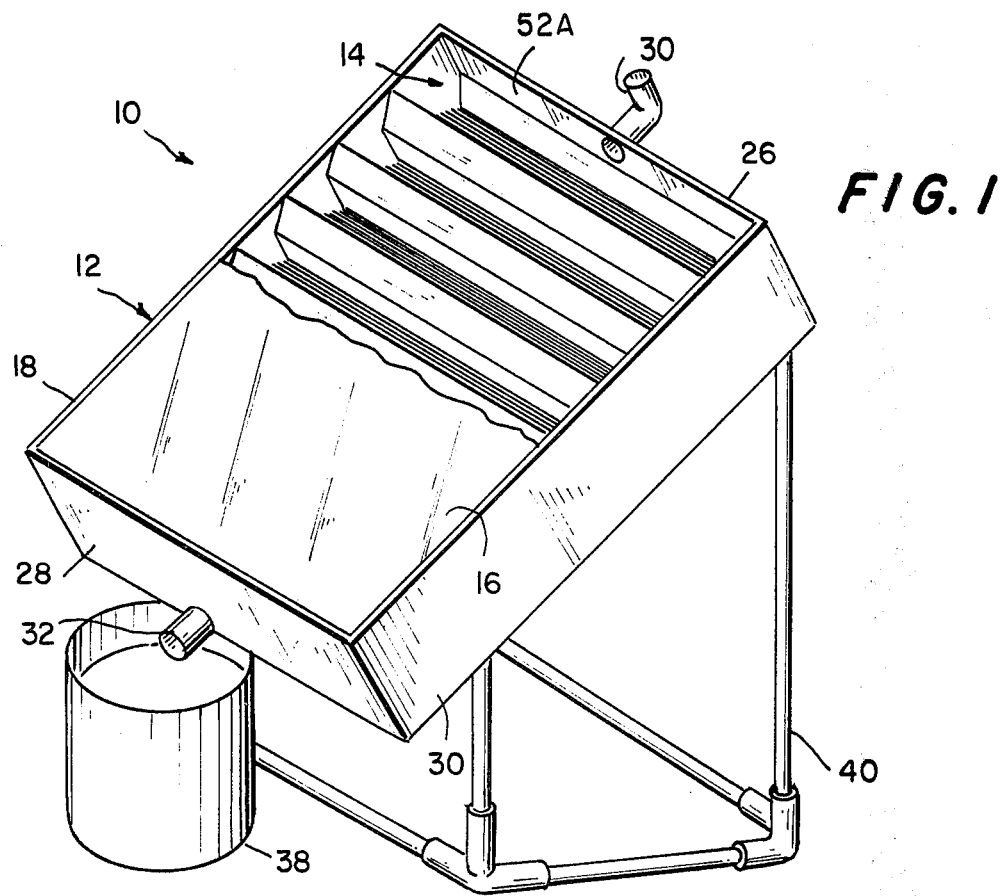
FIG. 1 is a perspective view of an embodiment of the invention, with an ancillary collection vessel.

An embodiment of the invention is illustrated in perspective in FIG. 1, with various parts shown in more detail in FIGS. 2–5, and attention is directed thereto.

Figure 3:
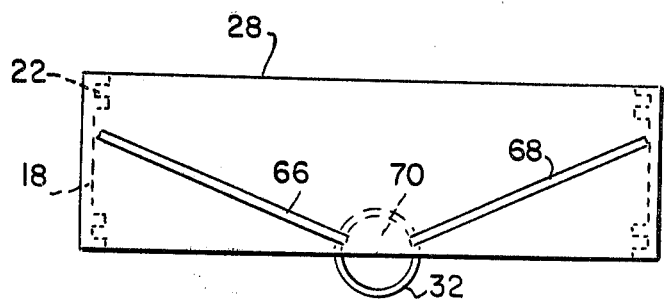
FIG. 3 is an elevation view of a collector plate.
Figure 4:
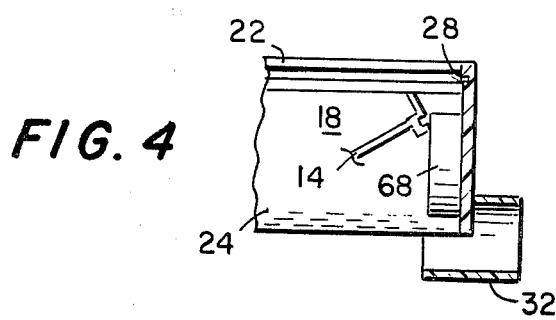
FIG. 4 is an end view of FIG. 3.

The solar still 10 comprises a box-like frame 12, a plurality of distillation trays 14, and a transparent cover 16, generally glass. More particularly, frame 12 comprises a pair of side-walls 18, 20 including upper and lower channels 22, 24 (FIG. 5), an upper or back end wall 26 and a lower, front end wall 28 more correctly termed a collector plate (FIGS. 3, 4). End wall 26 may include an optional filling port 30, and collector plate 28 may include an outlet 32, as explained in more detail hereinbelow. The trays 14 comprise two extrusions 34, 36 (FIG. 2).

Shown in FIG. 1 are a collection vessel 38 and still support means 40. While a collection vessel is an obvious necessity, it forms no part of the present invention. If a number of units are ganged, for example, a trough and cistern may be used. Support means 40 may be a stand or legs forming part of the still, or may be merely a sloped surface, such as a roof.

As shown, means 40 comprise standard plastic pipe and fittings, with the upright members turnable in threaded fittings so the unit can be levelled and set at the proper angle even on an uneven surface.

Figure 2:
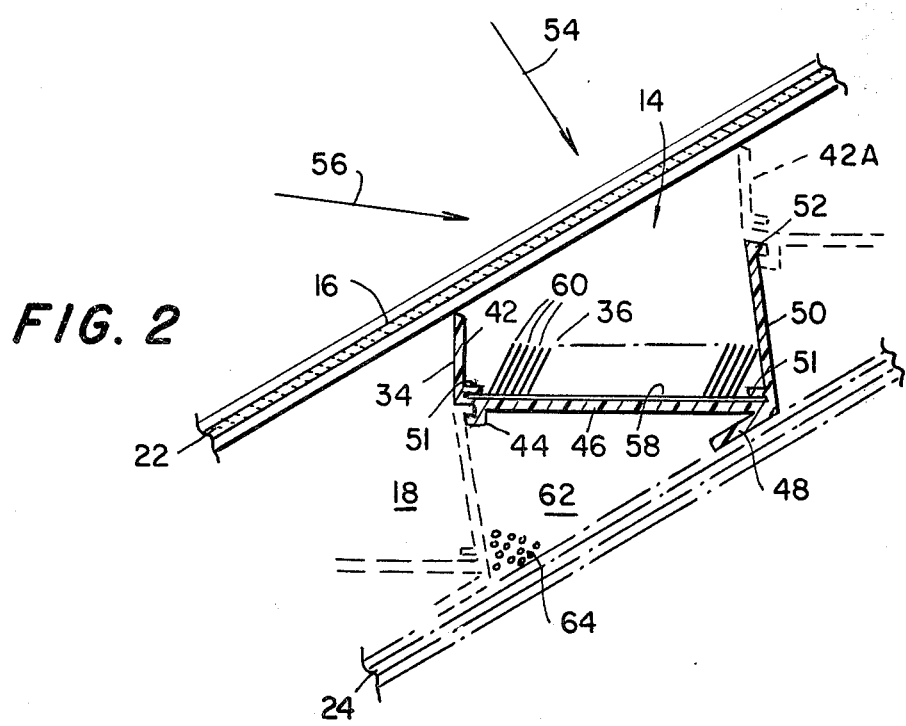
FIG. 2 is a cross-sectional end view of the tray extrusion and the heat absorber extrusion, in their operative relation.

FIG. 2 shows trays 14 in cross-section, and attention is directed thereto. It should be noted that trays 14 are sized to fit between upper and lower channels 22, 24 of side walls 18, 20 at the proper angle for operation, generally about 35° (it being understood that in use the still is at the angle and the trays are horizontal). The tray element 34 is generally U- or channel-shaped and comprises a forward wall 42, a forward interlock element 44, in this case a longitudinal channel at the lower edge of wall 42, a bottom or base 46, a base cleat 48 that rests at either end on the top of channel 24, a back wall 50, including along its upper edge a rear interlock element 52, in this case a shoulder adapted to mate with channel 44 of the next tray.

It will be noted that while forward wall 42 forms about a 90° angle with base 46, rear wall 50 forms something less than a 90° angle. Further, tray extrusions 34 are to be extruded from an opaque, white plastic. This is an important feature of the invention insofar as back wall 50 and its adjoining front wall 42A (of the next tray) form a reflecting surface directing the solar radiation into the collection area at the bottom of tray 14. This becomes progressively more important as the incident angle of radiation goes from relatively high (arrow 54) to relatively low (arrow 56).

The second portion of tray 14 is heat absorber extrusion 36, which is slidably engaged in base 46 under bases 51. This extrusion appears as an upside-down "comb" in cross-section, with the "teeth" at a raked-back angle, but of course in full comprises a flat, rectangular base 58 having a plurality of upstanding, longitudinal blades 60 extending therefrom. Blades 60 are angled back so as to prevent any incident radiation from directly impinging on base 58. Further absorber extrusion 36 is fabricated from opaque black plastic and has a matte or nonreflective finish. This object, of course, is to maximize the capture of solar radiation in blades 60, where heat is readily transferred to the surrounding water, and minimize heat loss by conduction through bases 58, 46 and re-radiation from the bottom of the unit.

This minimizing of heat loss is further improved by (1) providing a bottom plate (not shown) to cover the bottom of still 10 in lower channel 24, and (2) filling the resulting enclosed spaces 62 beneath trays 14 with a thermal insulating material 64.

Referring again to FIG. 1, back plate 26 is sized so as to allow glass plate 16 to be slid out thereover, and the shoulder 52A of top-most tray 14 abuts against plate 26. Collector plate 28 is shown in more detail in FIGS. 3 and 4, side and end elevations, respectively, and attention is directed thereto.

Collector plate 28 is also a flat rectangular plate, but is sized so that glass plate 16 will abut and rest thereagainst. The interior side of plate 28 is provided with a pair of sloped guides 66,68 extending from opposed points just beneath top channels 22 and at a height at least as high as the forward-most point of lowest tray 14 downwardly toward the center of plate 28, and terminating in spaced relation with each other at a point near the bottom, so that if a bottom plate is used in channels 24 it could not block opening 70 therebetween.

It will be appreciated that, when still 10 is in its operative position, guides 66,68 and plate 28 combine to form a pair of V-shaped troughs adapted to carry condensate to opening 70. It will be further appreciated that a collection vessel 38 may be merely placed below opening 70 and will be effective to collect condensate. However, a simple outlet pipe 32 adds some convenience. It comprises a length of rigid plastic tube with half its diameter cut away over about half its length, and glued to the front and bottom of plate 28 so that the remaining half section forms a catch-trough for condensate issuing from opening 70. The outer portion of outlet 32 may form a nipple for connection of a hose to pass condensate to a remote collection vessel.

Figure 5:
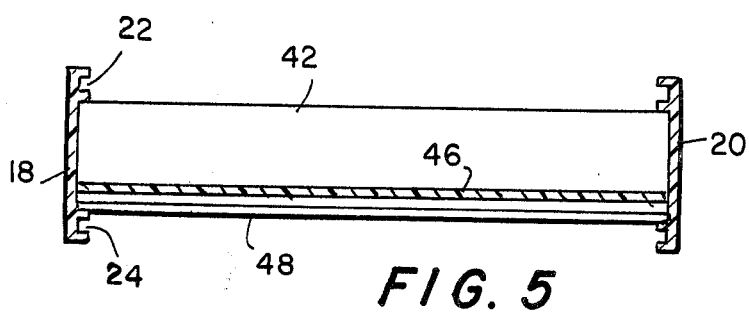
FIG. 5 is an end view of the FIG. 1 embodiment, showing the cross-section of the side-wall extrusions.

FIG. 5 is an end elevation looking toward the tray 14 of FIG. 2, and illustrating more clearly the relation of trays 14 and sidewalls 18,20.

Referring again to FIG. 1, it is to be noted that inlet or charging port 30 is also an optional feature, insofar as still 10 may be loaded with water merely by removing glass plate 16.

In operation, still 10 functions as any other solar still: with trays 14 filled with water and plate 16 in place, water is evaporated from trays 14 and condenses on the underside of plate 16, running down the latter for collection at plate 28. It will be appreciated that condensate droplets are held on plate 16 by surface tension, and if there are too many trays 14 in the unit (e.g. if it is too long) there will be a significant reflux action of condensed distillate dropping into a lower tray. This lowers efficiency of the unit.

Also, since loading of still 10 will usually result in some overflow, it is important that the unit be in operation and effectively flush or purge itself before collection in vessel 38 is started. A still further precaution is that the unit not be allowed to evaporate to dryness, insofar as absent the heat transferred by heat of evaporation, temperature buildup can be rapid and result in damage to the unit.

Figure 6:
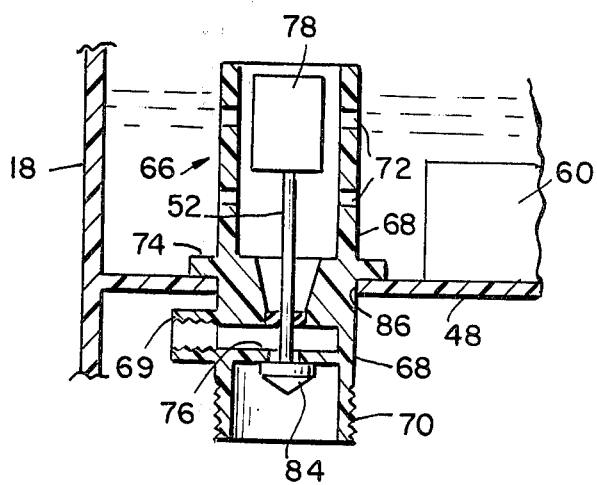
FIG. 6 is a cross-sectional elevation of a check valve that may optionally be employed to monitor water level in the FIG. 1 embodiment.

Both of these problems are effectively overcome by providing for substantially continuous operation, and attention is directed to FIG. 6.

FIG. 6 illustrates a simple check valve which can connect still 10 to a source of distilland and continuously maintain a desired level thereof in trays 14.

More particularly, in this embodiment absorber 36 with vanes 60 is cut short on the bottom tray, to make room for check valve 66. This is a simple device comprising an open-ended plastic cylinder 68 having a base coupling (e.g. threads) 70 on the lower end, perforations 72 on the upper end, an intermediate outwardly-extending annular shoulder or seating collar 74, and a valve seat 76. The valve element itself is merely a float 78, connected by a rod 82 to the valve element 84. Valve 66 is glued in a hole 86 drilled in tray 48. When float 78 opens valve 84, water from a source will flow through to outlet port 69, connected by a hose (not shown) to inlet port 30 at the top of the unit. It is to be noted that in an 8-tray unit the height between the top and bottom trays is under 10 inches, so only a very modest pressure "head" is needed, and this can be provided by elevating the source water container. Other simple valving arrangements are known, and it is also possible to merely allow distilland to trickle into the unit through a small orifice in the inlet port 30.

Figure 9:
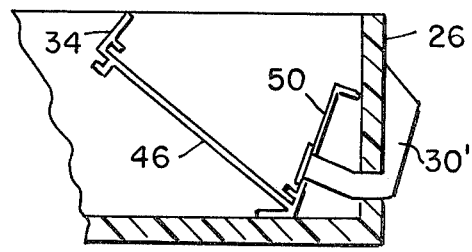
FIG. 9 is a cross-sectional elevation of an alternate filling arrangement.

Care must be taken to avoid overflow and run-off of excess distilland into the distillate, contaminating the latter. This can occur, for example, if the unit is filled too rapidly, and distilland splashes up onto glass cover plate 16. It is also necessary to avoid overflow caused by overfilling, as might happen if a piece of dirt become lodged between valve element 84 and seat 76. A simple expedient is to install an overflow pipe (not shown) in the bottom tray. The splashing of distilland onto cover glass 16 can be avoided by the modified filling hole illustrated in FIG. 9. As shown, a funnel-shaped element 104 includes a conduit 106 passing through backwall 26 and rear wall 50 of the top tray. Alternatively, it could pass through bottom 46 of the tray, though this would require removing some fins.

Figure 7:
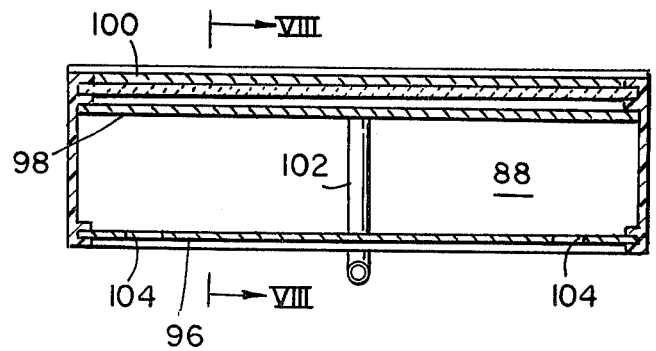
FIG. 7 is front elevation view of a preferred collector plate.
Figure 8:
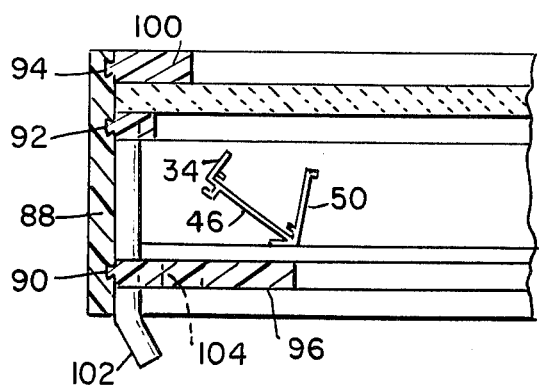
FIG. 8 is an end view of FIG. 7.

With the collector plate 28 of FIGS. 3 and 4, such an overflow pipe is needed, insofar as any distilland overflowing the bottom tray will mix with distillate. With this embodiment, a bottom cover in tracks 24 is also adviseable, insofar as ambient air entering around plate 28 will reduce both evaporation from the bottom tray or trays and reduce condensation above these trays, reducing overall efficiency. Both the overflow and efficiency problems are overcome with the collector plate design shown in FIGS. 7 and 8, and attention is directed thereto.

In this embodiment, plate 88 is an extrusion having three grooves 90, 92, 94 adapted to slidingly engage three mating extrusions 96, 98, 100. Groove 90 is at the level of track 24, and extrusion 96 is a plate that fits therein and forms a partial bottom cover, blocking ambient air entry. Groove 92 is just below the lower rail of track 22, and engages a trough-forming plate 98 that collects the water. Plate 98 has a central hole engaging a flush-mounted distillate outlet pipe 102, which extends down through plate 96 for connection by hose to a collector vessel. Groove 94 and plate 100 form a cover over glass plate 16, making a better seal and, again, preventing ingress of ambient air or egress of vapor.

Though trough 98 is not angled, as in the FIGS. 3 and 4 embodiments, water drops thereon coalesce and flow out of pipe 102, having no place else to go. Because plate 98 is positioned forward and not below the lip of the bottom tray, any overflow therefrom will drop onto bottom cover 96, which is provided with drain holes 104.

Depending on the nature of the distilland (dissolved salts, suspended solids, etc.), maintenance of still 10 must be carried out more or less frequently. This is done with a stiff brush and an appropriate cleaning solution, followed by thorough flushing.

The fact that the unit in its essential parts is constructed of several plastic extrusions makes its width entirely optional, though glass plates may become cumbersome and extra structural support needed if units are too wide. Length, as noted, is somewhat limited by the reflux problem. Ganging of multiple units is, of course, relatively simple.

While plate 16 has been referred to as glass, it may also be a transparent plastic, and whether of either material several expedients may be employed to increase efficiency. The first is the use, on the top surface, of an antireflective coating which is obviously effective to trap more of the incident solar energy. Such coatings are known, and may comprise silanes or other compounds. A second expedient, also a coating, is a spectrum-shifting coating that transmits less in the ultraviolet range and more in the infrared, which is desireable for a still. Such coatings are in the form of a gel which, while soft, has imprinted thereon a pattern, like a diffraction pattern, which is then baked in.

Since plate 16 is a condensation surface, thinner rather than thicker plates are preferred, to increase thermal conductivity.

Also, since some plastics are known to degrade under ultraviolet radiation, they should be avoided; more particularly, plastics especially formulated to be resistant to such radiation are to be preferred for all extrusions and plates. Good results have been obtained using a polyvinyl chloride (B. F. Goodrich 85857) with a 133 or 141 white colorant and an ultraviolet inhibitor.

During operation, any leaks or air around plate 16 will manifest themselves by the absence of condensation, and caulking (such as Mortite, TM) may be applied, or, alternatively, resilient seals may be installed.

The still starts to operate effectively at an internal temperature above about 150° F. This can be reached even on cold, sunny days if heat losses are minimized (insulation, bottom cover, etc.). When internal temperature reaches or exceeds 175° F., of course, distillation becomes very rapid.

Various changes in the details, steps, materials and arrangements of parts, which have been herein described and illustrated to explain the nature of the invention, may be made by those skilled in the art within the principle and scope of the invention as defined in the appended claims.

What is claimed is:

1. A solar still comprising:
   spaced, parallel sidewalls including channel means along the upper edges thereof;
   a plurality of interlocking, angled trays extending between said sidewalls at an angle whereby the bottoms of said trays are level when said still is placed at an angle for use;
   a heat absorber element in the bottom of each said tray, said absorber element comprising a bottom plate resting on the bottom of said tray and a plurality of upstanding, spaced, parallel vanes, said absorber element being of a dark, heat-absorbing color;
   an upper wall connecting said sidewalls at the upper end;
   a lower wall connecting said sidewalls at the lower end;
   transparent plate means slidably engaging said channel means and forming a cover for said still, said plate means butting against said lower wall; and
   condensate collection means on the interior of said lower wall, whereby condensate coming off said cover plate onto said lower wall may flow by gravity out of said still.

2. The solar still as claimed in claim 1, wherein each said tray comprises a front wall, a bottom and a back wall and interlock elements at the bottom of said front wall and the top of said rear wall.

3. The solar still as claimed in claim 1, and additionally comprising:
   second channel means along the lower edges of said side walls and adapted to slideably receive a bottom cover; and
   an angled cleat extending from the bottom rear of each said tray, and cleats adapted to rest on said second channel means and hold said trays at said angle.

4. The solar still as claimed in claim 2, and additionally comprising parallel boss means on the lower inner front and back walls of each said tray and adapted to slideably engage the bottom edges of said heat absorber elements thereunder.

5. The solar still as claimed in claim 1, wherein the vanes of said absorber element are at less than a 90° angle to said bottom plate.

6. The solar still as claimed in claim 1, and additionally comprising fill means in said upper wall.

7. The solar still as claimed in claim 1, wherein said collection means comprises trough means and conduit means, said trough adapted to feed condensate into said conduit.

* * * * *